United States Patent
Lai et al.

(10) Patent No.: US 12,003,837 B2
(45) Date of Patent: Jun. 4, 2024

(54) DUAL-LENS CAMERA SYSTEM WITH ONLY ONE IMAGE SENSOR

(71) Applicant: TRIPLE WIN TECHNOLOGY(SHENZHEN) CO. LTD., Shenzhen (CN)

(72) Inventors: Wen-Ching Lai, New Taipei (TW); Chao-Yu Qin, Guangdong (CN); Zhi-Wei Li, Jincheng (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 134 days.

(21) Appl. No.: 17/835,880

(22) Filed: Jun. 8, 2022

(65) Prior Publication Data

US 2023/0060674 A1  Mar. 2, 2023

(30) Foreign Application Priority Data

Aug. 25, 2021  (CN) .......................... 202110982760.7

(51) Int. Cl.
| | |
|---|---|
| *H04N 23/55* | (2023.01) |
| *G02B 13/00* | (2006.01) |
| *G02B 26/08* | (2006.01) |
| *H04N 13/207* | (2018.01) |
| *H04N 23/58* | (2023.01) |

(52) U.S. Cl.
CPC ......... *H04N 23/55* (2023.01); *G02B 13/0055* (2013.01); *G02B 26/0816* (2013.01); *H04N 13/207* (2018.05); *H04N 23/58* (2023.01)

(58) Field of Classification Search
CPC ...... H04N 23/55; H04N 13/207; H04N 23/58; H04N 23/54; H04N 23/16; H04N 23/50; H04N 23/698; G02B 13/0055; G02B 26/0816; G02B 7/08
USPC ...................................................... 348/36–38
See application file for complete search history.

(56) References Cited

U.S. PATENT DOCUMENTS

| | | | | |
|---|---|---|---|---|
| 5,727,239 | A | * 3/1998 | Hankawa | G03B 35/00 396/324 |
| 2017/0371230 | A1 | * 12/2017 | Ko | H04N 23/55 |
| 2021/0176397 | A1 | * 6/2021 | Müller | H04N 23/69 |
| 2021/0314467 | A1 | * 10/2021 | Kramer | G03B 17/54 |

FOREIGN PATENT DOCUMENTS

CN  110798602 A  2/2020

* cited by examiner

*Primary Examiner* — Albert H Cutler
(74) *Attorney, Agent, or Firm* — ScienBiziP, P.C.

(57) ABSTRACT

A dual-lens camera system includes a first lens, a second lens, an image sensor corresponding to a position of the first lens, and a reflecting assembly. The reflecting assembly includes a first reflecting member and a second reflecting member corresponding to a position of the second lens. The first reflecting member is movable between a first position at which an optical path from the first lens to the image sensor is blocked but an optical path from the second reflecting member to the image sensor is not blocked, and a second position at which the optical path from the first lens to the image sensor is not blocked but the optical path from the second reflective member to the image sensor is blocked. Only one image sensor is used in the dual-lens camera system, which saves cost and takes up less internal space of the electronic device.

15 Claims, 5 Drawing Sheets

DUAL-LENS CAMERA SYSTEM WITH ONLY ONE IMAGE SENSOR

FIELD

The subject matter herein generally relates to a dual-lens camera system, and more particularly to a dual-lens camera system with only one image sensor.

BACKGROUND

In recent years, dual-lens camera systems have found wide applications in various kinds of electronic devices. A dual-lens camera system generally includes two lens, two actuators configured to drive the two lens respectively, and also includes two image sensors corresponding to the two lens. However, such dual-lens camera system has a high cost and uses much interior space of an electronic device.

BRIEF DESCRIPTION OF THE DRAWINGS

Implementations of the present technology will now be described, by way of embodiment, with reference to the attached figures.

DETAILED DESCRIPTION

Figure 1:
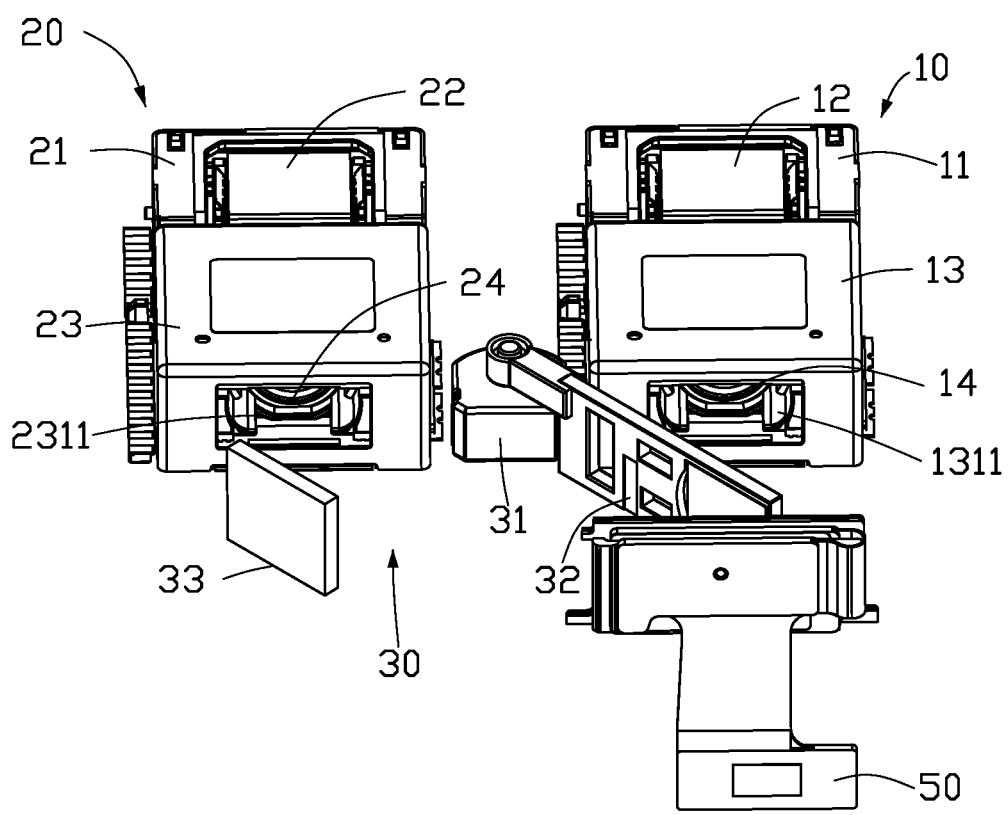
FIG. 1 is a schematic structural diagram of a dual-lens camera system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Referring to FIG. 1, an embodiment of a dual-lens camera system 100 is illustrated. The dual-lens camera system 100 may be applied to an electronic device having imaging capturing functions, such as mobile phones, or computers. The dual-lens camera system 100 includes a first lens assembly 10, a second lens assembly 20, a reflecting module 30, and an image sensor module 50. The first lens assembly 10 and the second lens assembly 20 are configured to receive external light. The image sensor module 50 cooperates with the reflecting assembly 30 to receive light from the first lens assembly 10 or the second lens assembly 20.

The first lens assembly 10 includes a first prism motor 11, a first prism 12, a first lens actuator 13, and a first lens 14. The first prism 12 is arranged on an object side of the first lens 14. The first prism motor 11 is operatively connected with the first prism 12. The first prism motor 11 is configured to rotate the first prism 12 to adjust a transmission path of the external light, achieving a stable optical image. The first lens 14 is disposed on the first lens actuator 13 and corresponds to a position of the first prism 12. The first lens 14 is configured to receive light refracted by the first prism 12.

In one embodiment, the first lens actuator 13 defines a first accommodation space 1311 penetrating the first lens actuator 13, and the first lens 14 is accommodated in the first accommodation space 1311. The first lens actuator 13 is configured to move the first lens 14 along an optical axis of the first lens 14. The first lens 14 may be screwed into the first accommodation space 1311.

The second lens assembly 20 is similar to the first lens assembly 10. The second lens assembly 20 includes a second prism motor 21, a second prism 22, a second lens actuator 23, and a second lens 24. The second prism 22 is arranged on an object side of the second lens 24. The object side of the second lens 24 is the same as the object side of the first lens 14. The second prism motor 21 is operatively connected with the second prism 22. The second prism motor 21 is configured to rotate the second prism 22 to adjust the transmission path of the external light, achieving a stable optical image. The second lens 24 is disposed on the second lens actuator 23 and is opposite to the second prism 22. The second lens 24 is configured to receive light refracted by the second prism 22.

In one embodiment, the second lens actuator 23 defines a second accommodation space 2311 penetrating the second lens actuator 23, and the second lens 24 is accommodated in the second accommodation space 2311. The second lens 24 may be screwed into the second accommodation space 2311.

The first prism motor 11 and the second prism motor 21 are operatively connected with the first prism 12 and the second prism 22 respectively by a drive mechanism, such as capstans, belts, chains, worm gears, magnetic coupling, inductive coupling, or capacitive coupling. The first prism motor 11 and the second prism motor 21 may be any type of motor, including stepper motors, servo motors, linear motors, hydraulic motors and the like.

The first lens actuator 13 and the second lens actuator 14 have an auto-focusing function. Each of the first lens actuator 13 and the second lens actuator 14 may be a voice coil motor (VCM), a DC motor, or a stepper motor.

In other embodiments, a structure of the first lens assembly 10 may be different from a structure of the second lens assembly 20.

Figure 2:
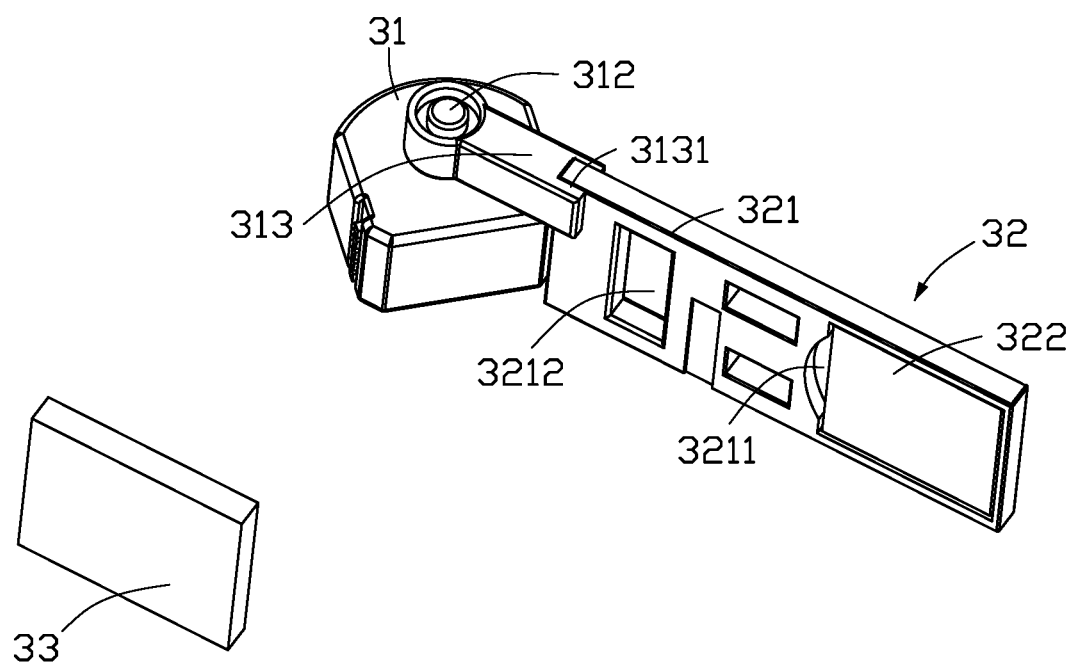
FIG. 2 is a schematic structural diagram of a reflecting module of the dual-lens camera system of FIG. 1.

Referring to FIGS. 1 and 2, the reflecting module 30 includes a motor 31, a first reflecting member 32, and a second reflecting member 33. The first reflecting member 32 is arranged on an image side of the first lens 14, and the second reflecting member 33 is arranged on an image side of the second lens 24. The image side of the first lens 14 is the same as the image side of the second lens 24. The motor 31 is operatively connected with the first reflecting member 32 and is configured to drive the first reflecting member 32 to move.

The motor 31 includes a rotating shaft 312. The first reflecting member 32 is connected with the rotating shaft 312 through a connecting member 313. In one embodiment, an end of the connecting member 313 is sleeved on the rotating shaft 312, and other end of the connecting member 313 is detachably connected with the first reflecting member 32.

In one embodiment, the connecting member 313 includes two clamping portions 3131 on one end. An end of the first reflecting member 32 is clamped between the two clamping portions 3131.

The first reflecting member 32 includes a bracket 321 and a reflector 322. An end of the bracket 321 is clamped between the two clamping portions 3131. The reflector 322 is disposed on an end of the bracket 321 away from the two clamping portions 3131.

In one embodiment, the bracket 321 defines a groove 3211, and the reflector 322 is accommodated in the groove 3211.

In one embodiment, the bracket 321 further defines a plurality of through holes 321 penetrating the bracket 3212, for weight-reducing purposes.

Figure 4:
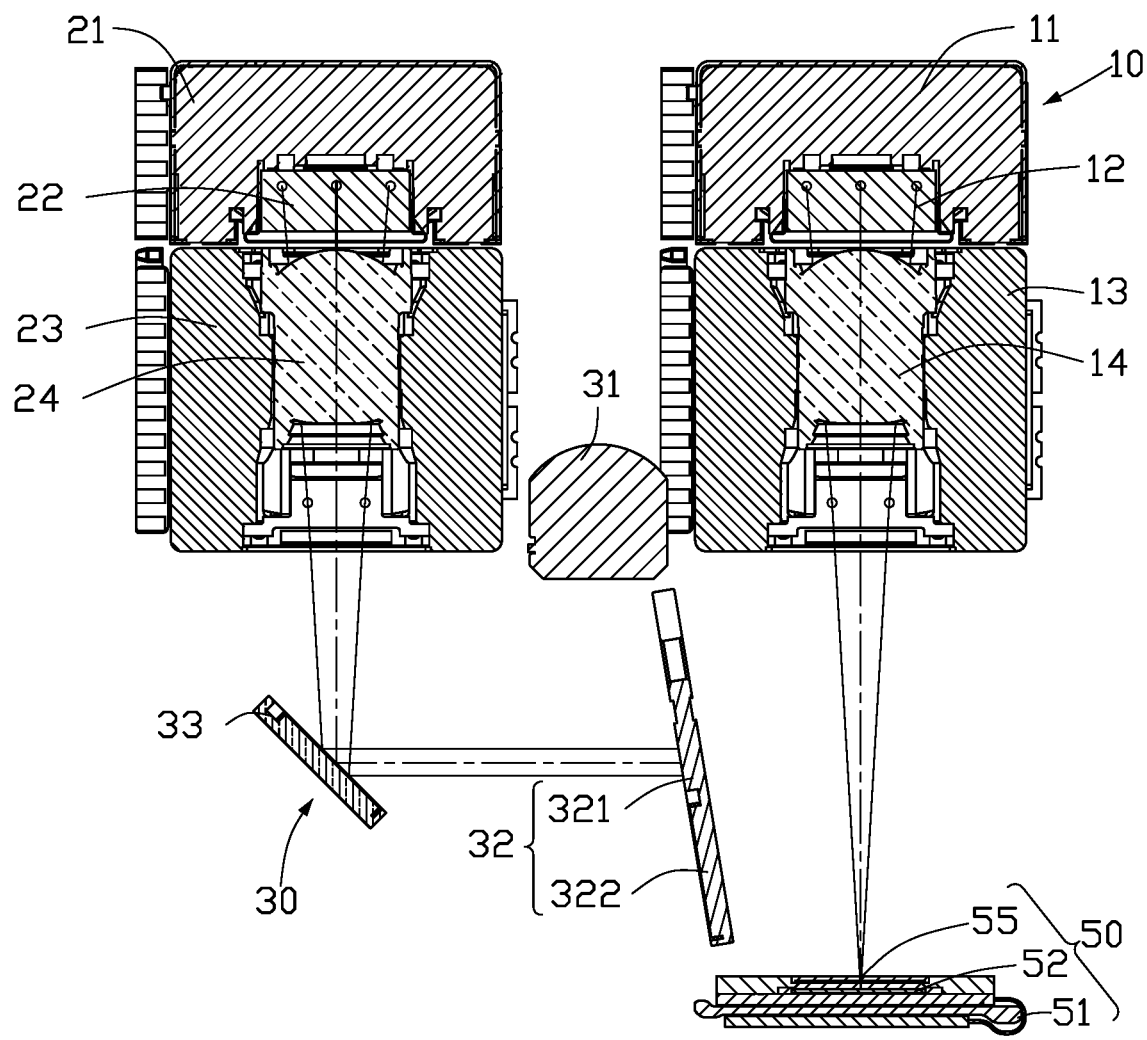
FIG. 4 is a schematic view showing a first lens assembly of the dual-lens camera system of FIG. 1 in a working state.
Figure 5:
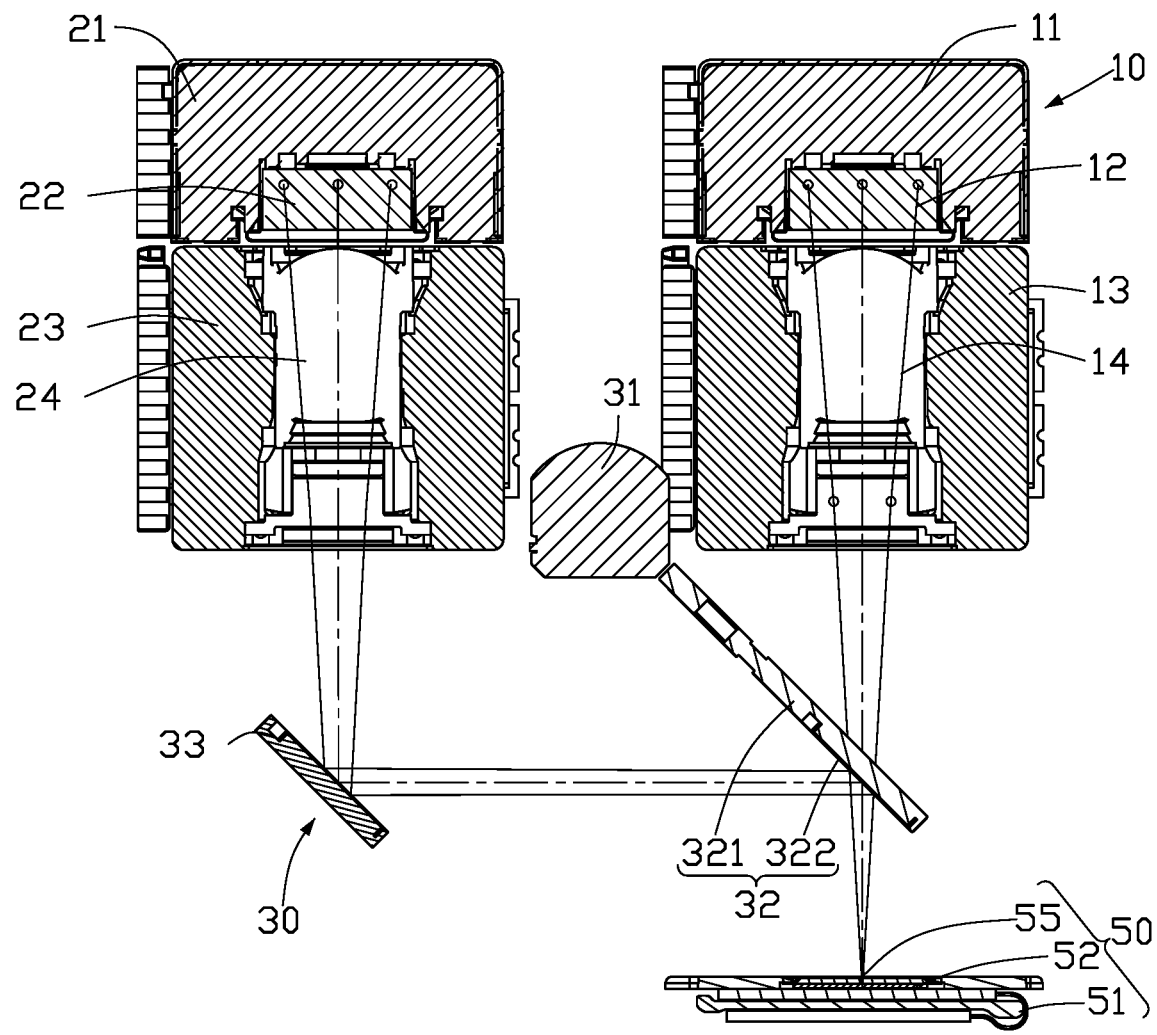
FIG. 5 is a schematic view showing a second lens assembly of the dual-lens camera system of FIG. 1 in a working state.

Referring to FIGS. 4 and 5, the second reflecting member 33 is arranged on an optical axis of the second lens 24, and an included angle between the second reflecting member 33 and the optical axis of the second lens 24 is 45 degrees. Light passes through the second prism 22 and the second lens 24 to reach the second reflecting member 33, then is reflected to the first reflecting member 32.

The image sensor module 50 is arranged on an optical axis of the first lens 14, and light from the first lens assembly 10 can focus on the image sensor module 50. The motor 31 moves the first reflecting member 32 to a first position at which an optical path from the first lens 14 to the image sensor module 50 is blocked and an optical path from the second reflecting member 33 to the image sensor module 50 is not blocked. The motor 31 can also move the first reflecting member 32 to a second position at which the optical path from the first lens 14 to the image sensor module 50 is not blocked and the optical path from the second reflecting member 33 to the image sensor module 50 is blocked. When the first reflecting member 32 is at the first position, light passing through the second prism 22 and the second lens 24 is reflected to the first reflector 322 by the second reflecting member 33, then is reflected to the image sensor module 50, and light passing through the first prism 12 and the first lens 24 is blocked by the bracket 321. When the first reflecting member 32 is at the second position, the light passing through the second prism 22 and the second lens 24 is reflected to the bracket 321 and is blocked, and the light passing through the first prism 12 and the first lens 24 reaches the image sensor module 50 directly.

In one embodiment, when the first reflecting member 32 is at the first position, an included angle between the first reflecting member 32 and the optical axis of the first lens 14 is 45 degrees. When the first reflecting member 32 is at the second position, an included angle between an extension line of the first reflecting member 32 and the optical axis of the first lens 14 is 20 degrees.

Figure 3:
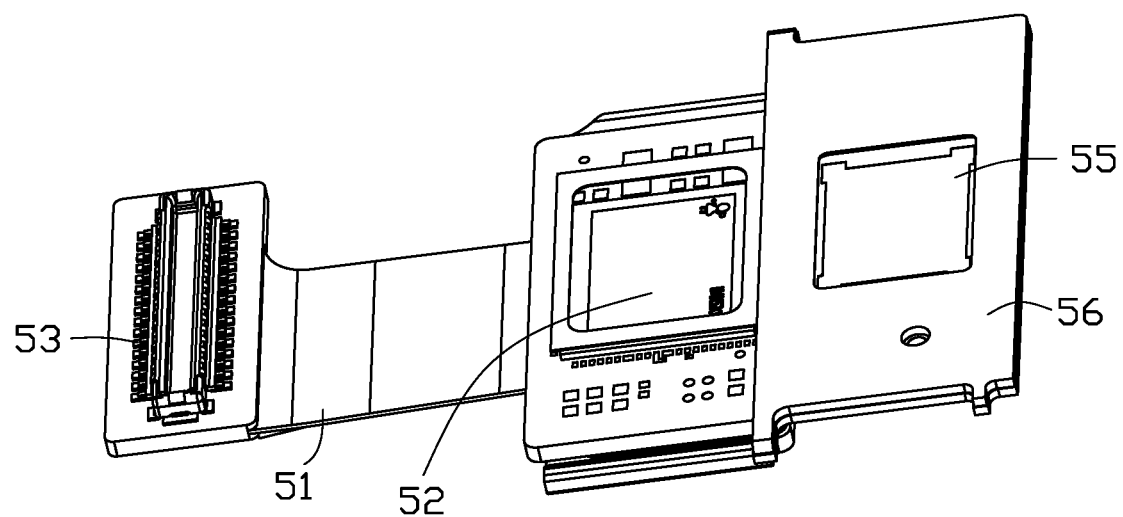
FIG. 3 is a schematic structural diagram of an image sensor module of the dual-lens camera system of FIG. 1.

Referring to FIG. 3, the image sensor module 50 includes a circuit board 51, an image sensor 52, and a connector 53. The image sensor 52 and the connector 53 are disposed on a same side of the circuit board 51. The connector 53 is configured to electrically connect with external components. The image sensor 52 is configured to receive light from the first lens assembly or the second lens assembly and generate an electronic signal.

In one embodiment, the image sensor module 50 further includes a glass sheet 55 and a mounting frame 56. The mounting frame 52 is disposed on the circuit board 51 and surrounds the image sensor 52. The glass sheet 55 is disposed on the mounting frame 56 and is located above the image sensor 52. The glass sheet 55 may be fixed on the mounting frame 56 by an adhesive.

In one embodiment, centers of the glass sheet 55, the image sensor 52, and the first prism 12 are located on a straight line, so that the light passing through the first prism 12 can completely pass through the glass sheet 55 and focus on the image sensor 52, rendering clarity to images.

When using the first lens assembly 10, the motor 31 drives the first reflecting member 32 to rotate to the second position, light passing through the first lens assembly 10 reaches the image sensor 52 directly; light passing through the second lens assembly 20 is reflected by the second reflecting member 33 and then is blocked by the bracket 321, so that the light passing through the second lens assembly 20 cannot reach the image sensor 52. When using the second lens assembly 20, the motor 31 drives the first reflecting member 32 to rotate to the first position, light passing through the second lens assembly 20 is reflected by the second reflecting member 33 and the first reflecting member 32 in turn, then reaches the image sensor 52; and light passing through the first lens assembly 10 is blocked by the first reflecting member 32 and cannot reach the image sensor 52.

In the dual-lens camera system 100, the motor 31 drives the first reflecting member 32 to rotate to switch between the first lens assembly 10 and the second lens assembly 20, thereby realizing different optical zooms. Only one image sensor is used in the dual-lens camera system 100, which saves cost and takes up less internal space of the electronic device.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A dual-lens camera system comprising:
a first lens assembly comprising a first lens;
a second lens assembly comprising a second lens;
an image sensor module comprising an image sensor corresponding to a position of the first lens; and
a reflecting assembly comprising:
a first reflecting member; and
a second reflecting member corresponding to a position of the second lens assembly and configured to reflect light from the second lens assembly,
wherein the first reflecting member is movable between a first position at which an optical path from the first lens to the image sensor is blocked but an optical path from the second reflecting member to the image sensor is not blocked, and a second position at which the optical path from the first lens to the image sensor is not blocked but the optical path from the second reflecting member to the image sensor is blocked, the reflecting assembly further comprises a motor and a connecting member, the motor is coupled to the first reflecting member and configured to drive the first reflecting member to move, the motor comprises a rotating shaft, the first reflecting member comprises a bracket coupled to the rotating shaft, the connecting member comprises two clamping portions, an end of the connecting member away from the two clamping portions is coupled to the rotating shaft, and an end of the bracket is clamped between the two clamping portions.

2. The dual-lens camera system of claim 1, wherein the first reflecting member further comprises a reflector disposed on the bracket.

3. The dual-lens camera system of claim 2, wherein the bracket defines a plurality of through holes.

4. The dual-lens camera system of claim 1, wherein an included angle between the second reflecting member and an optical axis of the second lens is 45 degrees.

5. The dual-lens camera system of claim 4, wherein when the first reflecting member is at the first position, an included angle between the first reflecting member and an optical axis of the first lens is 45 degrees.

6. The dual-lens camera system of claim 5, wherein when the first reflecting member is at the second position, an included angle between an extension line of the first reflecting member and the optical axis of the first lens is 20 degrees.

7. The dual-lens camera system of claim 1, wherein the first lens assembly further comprises a first prism arranged on an object side of the first lens and a first prism motor coupled to the first prism, the second lens assembly further comprises a second prism arranged on an object side of the second lens and a second prism motor coupled to the second prism.

8. The dual-lens camera system of claim 1, wherein the first lens assembly further comprises a first lens actuator defining a first accommodation space penetrating the first lens actuator, the first lens is accommodated in the first accommodation space, the second lens assembly further comprises a second lens actuator defining a second accommodation space penetrating the second lens actuator, the second lens is accommodated in the second accommodation space.

9. A dual-lens camera system comprising:
a first lens assembly comprising a first lens;
a second lens assembly comprising a second lens;
an image sensor module comprising:
  a circuit board; and
  an image sensor disposed on the circuit board and corresponding to a position of the first lens; and
a reflecting assembly comprising:
  a first reflecting member; and
  a second reflecting member corresponding to a position of the second lens assembly and configured to reflect light from the second lens assembly,
wherein the first reflecting member is movable between a first position at which an optical path from the first lens to the image sensor is blocked but an optical path from the second reflecting member to the image sensor is not blocked, and a second position at which the optical path from the first lens to the image sensor is not blocked but the optical path from the second reflecting member to the image sensor is blocked, the reflecting assembly further comprises a motor and a connecting member, the motor is coupled to the first reflecting member and configured to drive the first reflecting member to move, the motor comprises a rotating shaft, the first reflecting member comprises a bracket and a reflector disposed on the bracket, the bracket is coupled to the rotating shaft, the connecting member comprises two clamping portions, an end of the connecting member away from the two clamping portions is coupled to the rotating shaft, and an end of the bracket is clamped between the two clamping portions.

10. The dual-lens camera system of claim 9, wherein the bracket defines a plurality of through holes.

11. The dual-lens camera system of claim 9, wherein an included angle between the second reflecting member and an optical axis of the second lens is 45 degrees.

12. The dual-lens camera system of claim 11, wherein when the first reflecting member is at the first position, an included angle between the first reflecting member and an optical axis of the first lens is 45 degrees.

13. The dual-lens camera system of claim 12, wherein when the first reflecting member is at the second position, an included angle between an extension line of the first reflecting member and the optical axis of the first lens is 20 degrees.

14. The dual-lens camera system of claim 9, wherein the first lens assembly further comprises a first prism arranged on an object side of the first lens and a first prism motor coupled to the first prism, the second lens assembly further comprises a second prism arranged on an object side of the second lens and a second prism motor coupled to the second prism.

15. The dual-lens camera system of claim 9, wherein the first lens assembly further comprises a first lens actuator defining a first accommodation space penetrating the first lens actuator, the first lens is accommodated in the first accommodation space, the second lens assembly further comprises a second lens actuator defining a second accommodation space penetrating the second lens actuator, the second lens is accommodated in the second accommodation space.

* * * * *